(12) United States Patent
Sakakibara et al.

(10) Patent No.: US 12,117,665 B2
(45) Date of Patent: Oct. 15, 2024

(54) OPTICAL DEVICE ACTUATOR AND LENS BARREL PROVIDED WITH SAME

(71) Applicant: Panasonic Intellectual Property Management Co., Ltd., Osaka (JP)

(72) Inventors: Takeshi Sakakibara, Osaka (JP); Makoto Umeda, Osaka (JP); Naoki Yoshikawa, Osaka (JP); Tatsuhiro Enomoto, Nara (JP); Tetsuya Morita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 693 days.

(21) Appl. No.: 17/421,597

(22) PCT Filed: Dec. 23, 2019

(86) PCT No.: PCT/JP2019/050347
§ 371 (c)(1),
(2) Date: Jul. 8, 2021

(87) PCT Pub. No.: WO2020/149108
PCT Pub. Date: Jul. 23, 2020

(65) Prior Publication Data
US 2022/0163752 A1    May 26, 2022

(30) Foreign Application Priority Data
Jan. 18, 2019  (JP) .................. 2019-006701

(51) Int. Cl.
*G02B 7/04* (2021.01)
*G02B 7/02* (2021.01)
*H02N 2/10* (2006.01)

(52) U.S. Cl.
CPC .............. *G02B 7/04* (2013.01); *G02B 7/021* (2013.01); *H02N 2/103* (2013.01)

(58) Field of Classification Search
CPC ........... G02B 7/04; G02B 7/021; H02N 2/103
See application file for complete search history.

(56) References Cited

U.S. PATENT DOCUMENTS 9,575,284 B2   2/2017  Shiraki
10,611,597 B1 * 4/2020  Thomas ................... B65C 9/18
(Continued)

FOREIGN PATENT DOCUMENTS

CN    207680945 U  *  8/2018  .......... B06B 1/0644
JP    2004297920 A  * 10/2004
(Continued)

OTHER PUBLICATIONS

Extended European Search Report corresponding to European Patent Application 19910219.5, mailed Feb. 14, 2022.
(Continued)

*Primary Examiner* — Ephrem Z Mebrahtu
(74) *Attorney, Agent, or Firm* — Renner, Otto, Boisselle & Sklar, LLP

(57) ABSTRACT

An optical device actuator comprises a movable frame (33) including a focus lens (L11); a main shaft guide (40); a piezoelectric element (36a); a weight (36b); a fixed frame (30); a guide holding frame (35); and a spring (36c). The piezoelectric element (36a) imparts vibration to a first end (40a) side of the main shaft guide (40). The fixed frame (30) supports the piezoelectric element (36a) and the weight (36b) disposed on the first end (40a) side of the main shaft guide (40). The guide holding frame (35) supports, in a fixed state, the main shaft guide (40) on a second end (40b) side on the opposite side from the first end (40a) side. The spring (36c) is provided on the first end (40a) side of the main shaft guide (40), and presses the piezoelectric element (36a) along the axial direction with respect to the first end (40a) of the main shaft guide (40) via the weight (36b).

14 Claims, 17 Drawing Sheets

(56) References Cited

U.S. PATENT DOCUMENTS

| | | | |
|---|---|---|---|
| 2007/0035210 A1 | 2/2007 | Sasaki | |
| 2014/0362280 A1 | 12/2014 | Shiraki | |
| 2016/0289878 A1* | 10/2016 | Kambara | ............... D05B 57/16 |
| 2019/0215456 A1* | 7/2019 | Fukai | ..................... H04N 23/80 |
| 2021/0255417 A1* | 8/2021 | Hosokawa | ............... H02N 2/04 |

FOREIGN PATENT DOCUMENTS

| | | | | |
|---|---|---|---|---|
| JP | 2007-049874 A | 2/2007 | | |
| JP | 2007-159172 A | 6/2007 | | |
| JP | 2007-282422 A | 10/2007 | | |
| JP | 2010-074912 A | 4/2010 | | |
| JP | 2012-189711 A | 10/2012 | | |
| JP | 2014-220909 A | 11/2014 | | |
| JP | 2014-239575 A | 12/2014 | | |
| JP | 2016-039707 A | 3/2016 | | |
| JP | 2018-181935 A | 11/2018 | | |
| WO | WO-2014091656 A1 * | 6/2014 | ............... G02B 7/08 |
| WO | 2014/174750 A1 | 10/2014 | | |

OTHER PUBLICATIONS

International Search Report of corresponding PCT Application No. PCT/JP2019/050347, mailed Mar. 17, 2020.

* cited by examiner

SECTION J—J

SECTION L—L

OPTICAL DEVICE ACTUATOR AND LENS BARREL PROVIDED WITH SAME

TECHNICAL FIELD

The present disclosure is related to an optical device actuator that drives a lens or another such optical device back and forth in the optical axis direction, and a lens barrel comprising this actuator.

BACKGROUND ART

Conventionally, a vibration actuator for guide shaft vibration, such as an SIDM (smooth impact drive mechanism) capable of high-speed response, has been used to move a lens frame of a lens barrel back and forth in the optical axis direction.

For example, Patent Literature 1 discloses a drive device comprising a drive shaft; a piezoelectric element to which a first end side of the drive shaft is fixed using an adhesive or the like; a support member that supports a second end side of the drive shaft in a state of being movable parallel to the axial direction; and an external force damping support unit (such as a spring) that is attached to the piezoelectric element to damp the influence of an external force that should be exerted on a drive unit including a drive shaft when the drive unit receives the external force in a direction different from the axial direction.

CITATION LIST

Patent Literature

Patent Literature 1: WO 2014/091656

SUMMARY

Technical Problem

However, the above-mentioned conventional drive device configuration has the following problems.

With the configuration of a drive device disclosed in the above publication, when an external force is exerted on a drive shaft or the like in a direction different from the axial direction, the influence of the external force can be damped by the external force damping support portion such as a spring.

However, with a conventional configuration, a so-called floating structure is employed in which a first end side of the drive shaft is supported in a state of being movable in the axial direction. That is, with a conventional configuration, the end of the guide shaft that guides the lens in the optical axis direction is supported in an unstable state. Therefore, when the drive device is mounted in a lens barrel including a focus lens group, for example, it may be difficult to adjust between the optical axes of the focus lens group guided by the guide shaft.

Solution to Problem

It is an object of the present disclosure to provide an optical device actuator with which damage caused by an external force exerted from a direction that intersects the axial direction of the guide shaft can be prevented, and the optical axis of a lens is easy to adjust, as well as a lens barrel comprising this actuator.

The optical device actuator disclosed herein comprises a movable frame including a lens; a guide shaft; a vibration imparting portion; a weight; a first frame body; a second frame body; and an elastic member. The guide shaft supports the movable frame so as to be movable along the optical axis of the lens. The vibration imparting portion imparts vibration to a first end side of the guide shaft. The weight is fixed to the vibration imparting portion. The first frame body supports the vibration imparting portion and the weight disposed on the first end side of the guide shaft. The second frame body supports, in a fixed state, the guide shaft on a second end side on the opposite side from the first end side. The elastic member is provided on the first end side of the guide shaft, and presses the vibration imparting portion in the axial direction against the first end of the guide shaft via the weight.

Advantageous Effects

With the optical device actuator disclosed herein, the optical axis of a lens can be easily adjusted, while damage caused by an external force exerted from a direction that intersects the axial direction of the guide shaft can be prevented.

DESCRIPTION OF EMBODIMENTS

Embodiments pertaining to this disclosure will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

Figure 1:
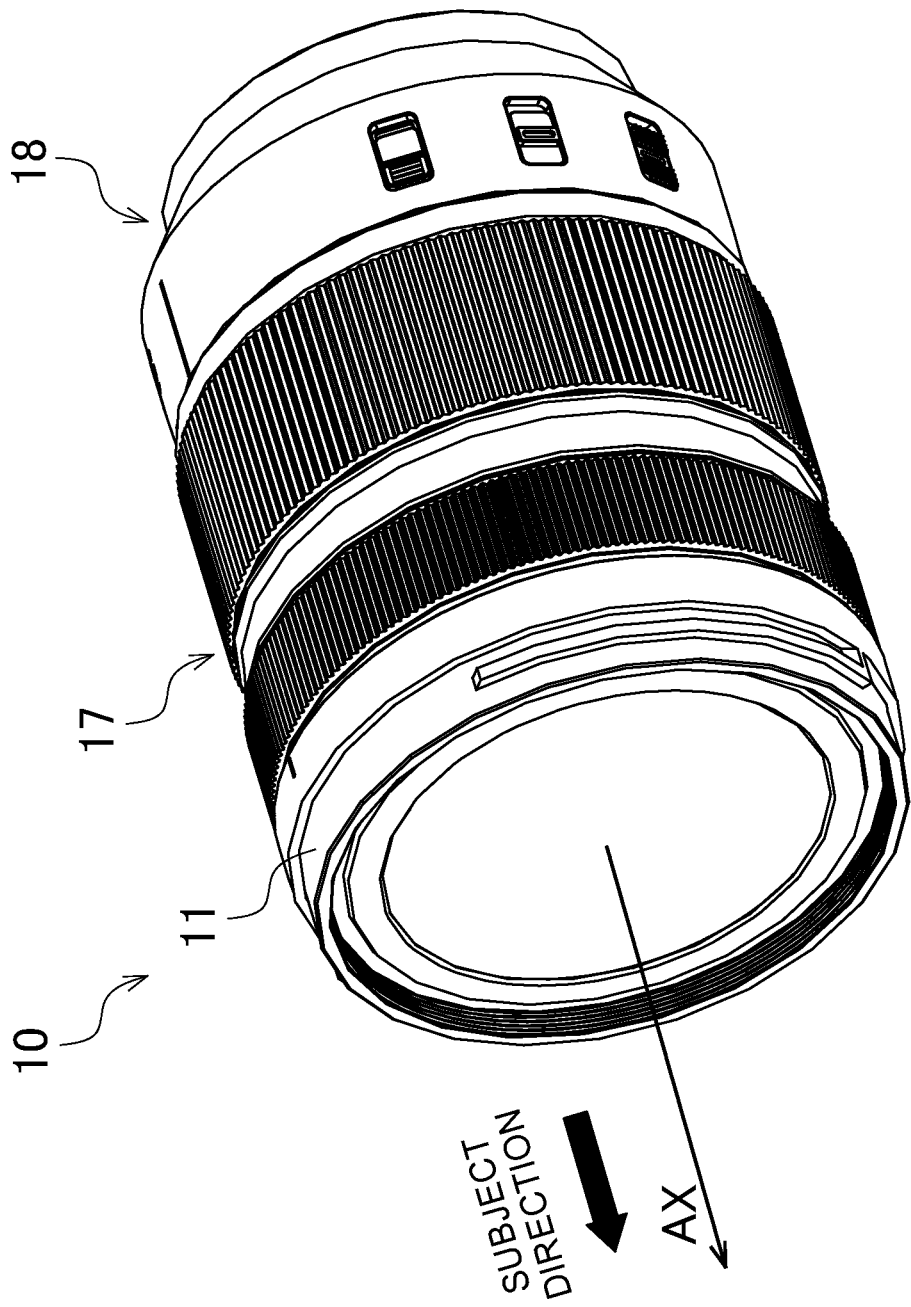
FIG. 1 is an oblique view of the configuration of a lens barrel equipped with the optical device actuator according to an embodiment of the present disclosure.

A lens barrel 10 equipped with an optical device actuator according to an embodiment of the present disclosure will be described below with reference to FIGS. 1 to 11.
(1) Configuration of Lens Barrel As shown in FIG. 1, the lens barrel 10 in this embodiment comprises an optical system including a plurality of lenses; a first lens group unit 11; a second lens group unit 12; a cam frame 13; a third and fourth lens group unit 14; a fifth lens group unit 16; an exterior unit 17; and a base ring 18. The lens barrel 10 is mounted to the mounting portion of a camera body (not shown) at the portion of the base ring 18.

Figure 2:
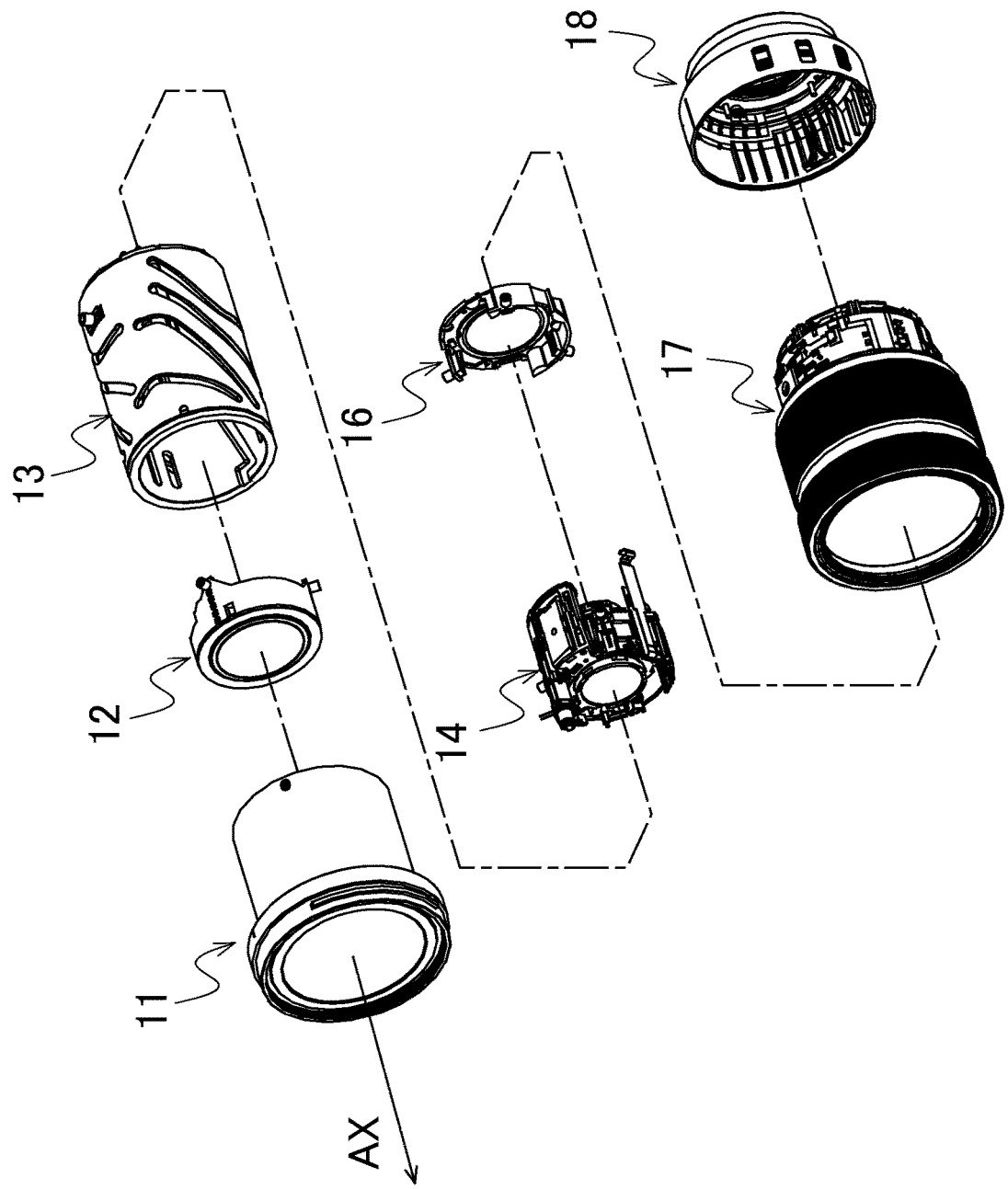
FIG. 2 is an exploded view of the components constituting the lens barrel in FIG. 1.

Here, the optical axis AX direction shown in FIG. 1 is the optical axis direction of the optical system of the lens barrel 10. Hereinafter, the subject side in the optical axis direction means the opposite side from the image plane side on which the imaging element (not shown) of the camera body is disposed. Hereinafter, the optical axis direction of the optical system of the lens barrel 10 will be referred to as the optical axis AX direction.
(1-1) Configuration of Optical System As shown in FIG. 2, the optical system of the lens barrel 10 is constituted by a first lens group unit 11, a second lens group unit 12, a cam frame 13, a third and fourth lens group unit 14, a fifth lens group unit 16, an exterior unit 17, a base ring 18, and so on.

The first lens group unit 11 is a cylindrical member, and a plurality of lenses are disposed on the subject side inside the unit. The first lens group unit 11 moves forward and backward in the optical axis AX direction while holding a plurality of lenses on the subject side.

Consequently, the distance between the plurality of lenses can be changed to perform wide-angle and telephoto photography.

The second lens group unit 12 is a cylindrical member disposed on the inner peripheral surface side of the first lens group unit 11. The second lens group unit 12 holds a plurality of lenses. The plurality of lenses included in the second lens group unit 12 are disposed closer to the image plane side in the optical axis AX direction than the plurality of lenses included in the first lens group unit 11.

As shown in FIG. 2, the cam frame 13 is a cylindrical member and has a cam groove formed therein. The cam frame 13 is disposed on the outer peripheral surface side of the second lens group unit 12 and the third and fourth lens group unit 14. A cam pin provided on the outer peripheral surface of the third and fourth lens group unit 14 is fitted into the cam groove of the cam frame 13.

The third and fourth lens group unit 14 is a focus unit that includes a focus lens L11, and just like the first lens group unit 11 and the second lens group unit 12, holds a plurality of lenses.

Figure 3:
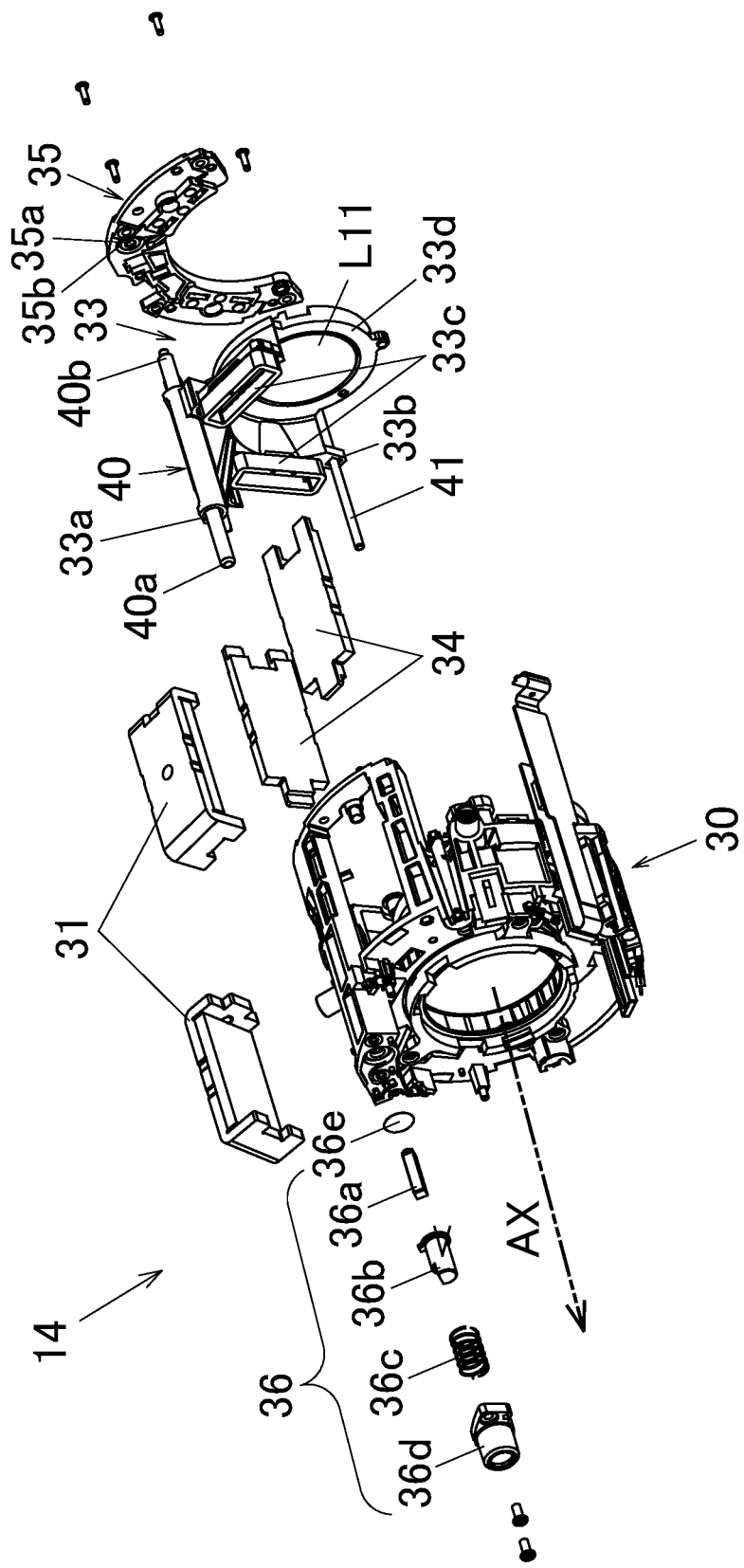
FIG. 3 is an exploded view of the components constituting the third and fourth lens group units included in the lens barrel in FIG. 2.

The third and fourth lens group unit 14 is a substantially cylindrical member and holds a plurality of lenses. As shown in FIG. 2, the plurality of lenses included in the third and fourth lens group unit 14 are disposed closer to the image plane side in the optical axis AX direction than the plurality of lenses included in the second lens group unit 12. Also, the third and fourth lens group unit 14 holds the focus lens L11 as shown in FIG. 3. The focus lens L11 is disposed closest to the image plane side in the optical axis AX direction among the plurality of lenses included in the third and fourth lens group unit 14. Furthermore, as shown in FIG. 3, the third and fourth lens group unit 14 is configured to include main yokes 31 and counter yokes 34 disposed on the outer peripheral portion of a substantially cylindrical fixed frame 30, and a drive coil 33c disposed on a movable frame 33. Consequently, the third and fourth lens group unit 14 is driven by a drive unit that includes the drive coil 33c, etc., so that the movable frame 33 including the focus lens L11 moves back and forth in the optical axis AX direction while holding a plurality of lenses.

The cam pin provided so as to project from the outer peripheral surface of the third and fourth lens group unit 14 (fixed frame 30) receives the rotational drive force imparted from a rotational drive source, and moves along the cam groove formed in the cam frame 13. Consequently, the plurality of lenses included in the first lens group unit 11 to the third and fourth lens group unit 14 are moved back and forth in the optical axis AX direction to adjust the distance between the plurality of lenses, which allows for wide-angle and telephoto photography.

The detailed configuration of the third and fourth lens group unit 14 will be described in detail below.

As shown in FIG. 2, the fifth lens group unit 16 is a substantially cylindrical member disposed on the inner peripheral surface side of the first lens group unit 11. The fifth lens group unit 16 holds a plurality of lenses. Also, the cam frame 13 is attached to the fifth lens group unit 16 in a state in which relative rotation is possible.

As shown in FIG. 2, the exterior unit 17 is a cylindrical member that constitutes the exterior portion of the lens barrel 10. An annular focus ring, a zoom ring, and the like are attached in a rotatable state to the outer peripheral surface of the exterior unit 17.

The base ring 18 is attached to the end on the image plane side of the exterior unit 17, and together with the exterior unit 17, constitutes the exterior portion of the lens barrel 10. The base ring 18 is then attached to the camera body (not shown).
(1-2) Configuration of Third and Fourth Lens Group Unit 14

The lens barrel 10 in this embodiment is a lens unit that moves the focus lens L11, which is held by a movable frame 33, back and forth in the optical axis AX direction. More specifically, as shown in FIG. 3, the third and fourth lens group unit 14 constituting the lens barrel 10 comprises the fixed frame 30, the main yokes 31, magnets (driving units) 32 (see FIG. 6, etc.), the movable frame 33, a main shaft guide (guide shaft) 40, a sub-shaft guide 41, the counter yokes 34, a guide holding frame (second frame body) 35, and a vibration imparting mechanism 36.

Also, in the third and fourth lens group unit 14, the fixed frame (first frame body) 30, the movable frame 33 that holds the focus lens L11, the main shaft guide 40, the guide holding frame (second frame body) 35, and the vibration imparting mechanism 36 constitute an optical device actuator that moves the movable frame 33 back and forth in the optical axis AX direction.

Figure 4:
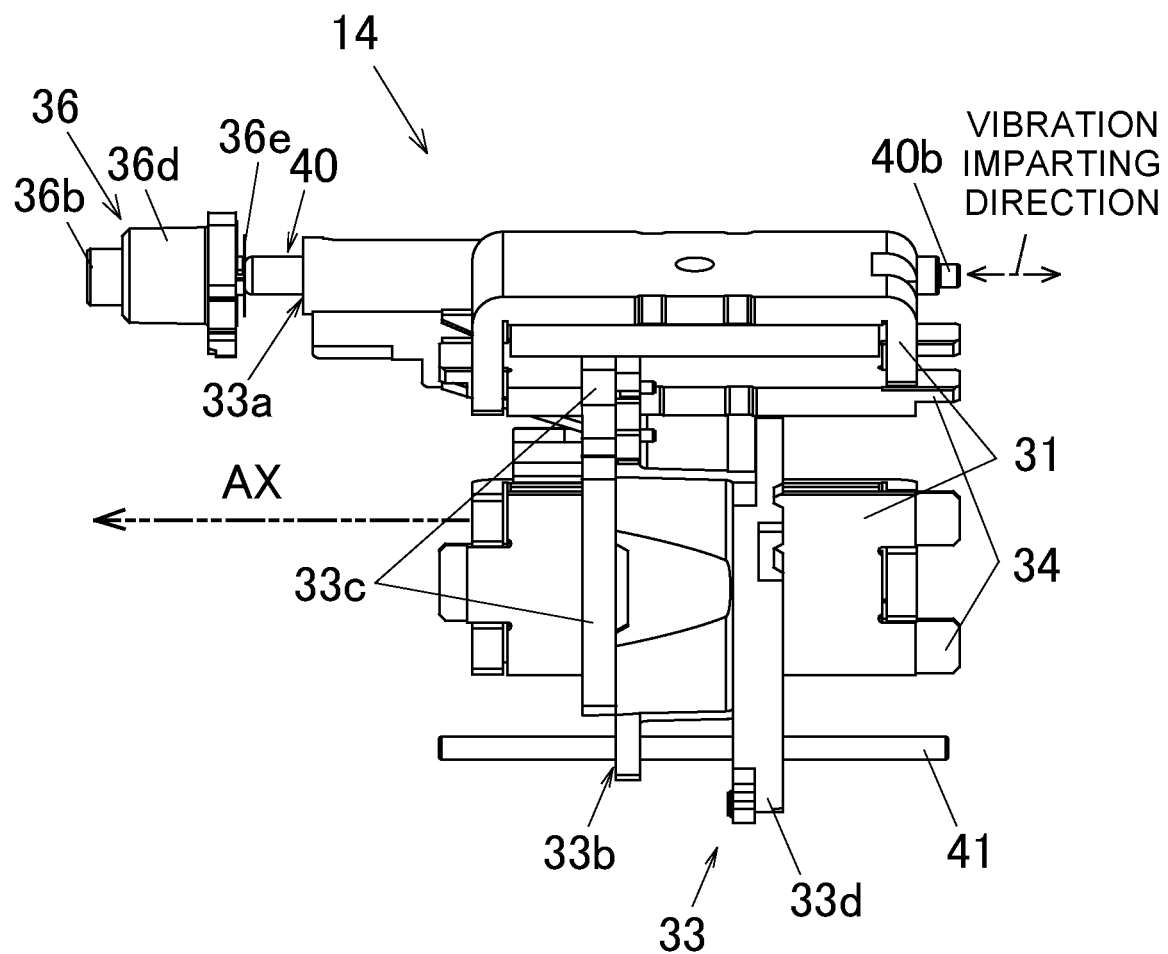
FIG. 4 is a side view of the direction of vibration imparted by the piezoelectric element in the third and fourth lens group units in FIG. 3.
Figure 5:
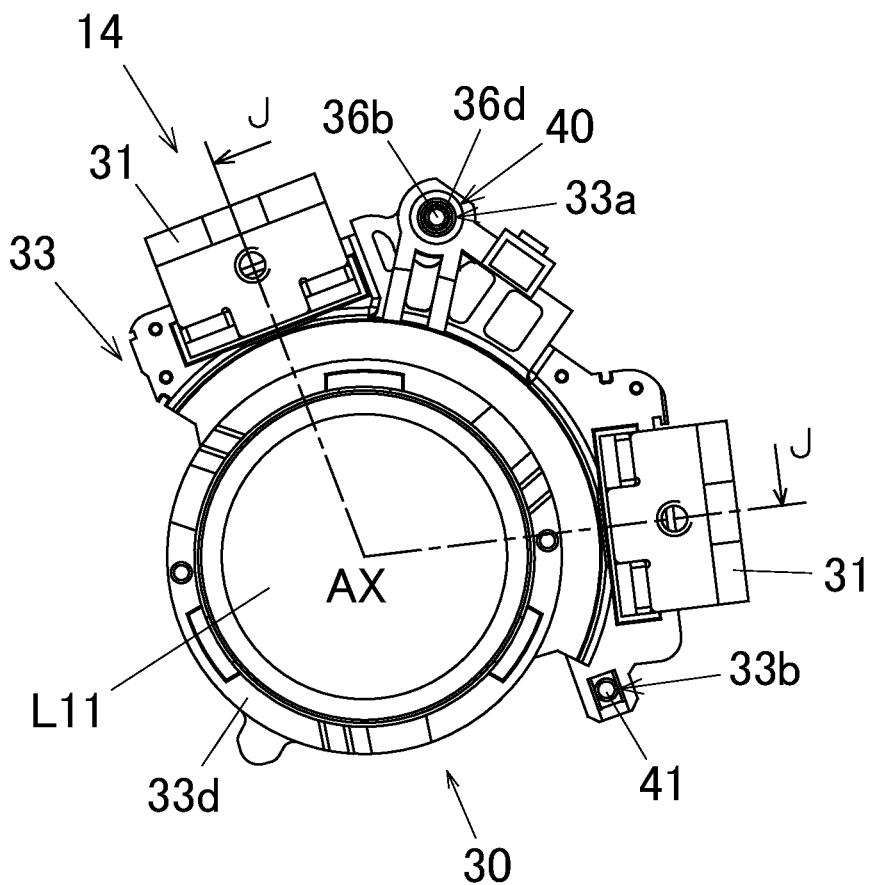
FIG. 5 is a front view of the third and fourth lens group units in FIG. 3 as viewed from the imaging element side.
Figure 6:
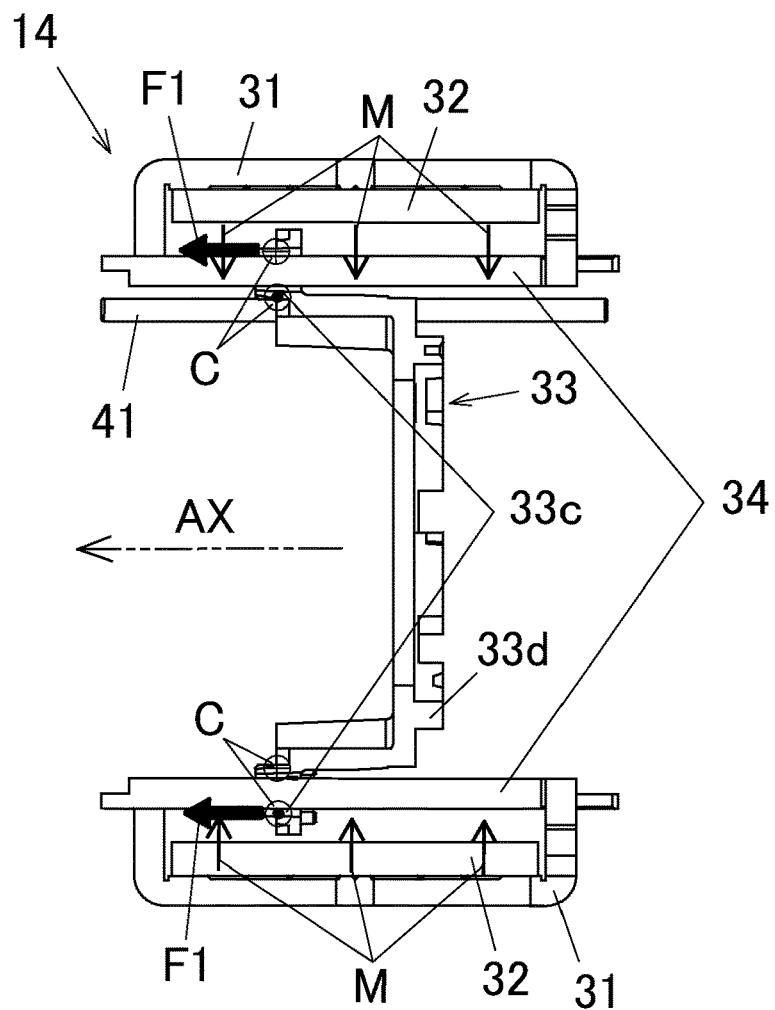
FIG. 6 is a cross-sectional view along the line J-J line in FIG. 5.
Figure 6:
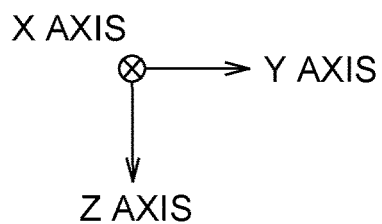
Figure 7:
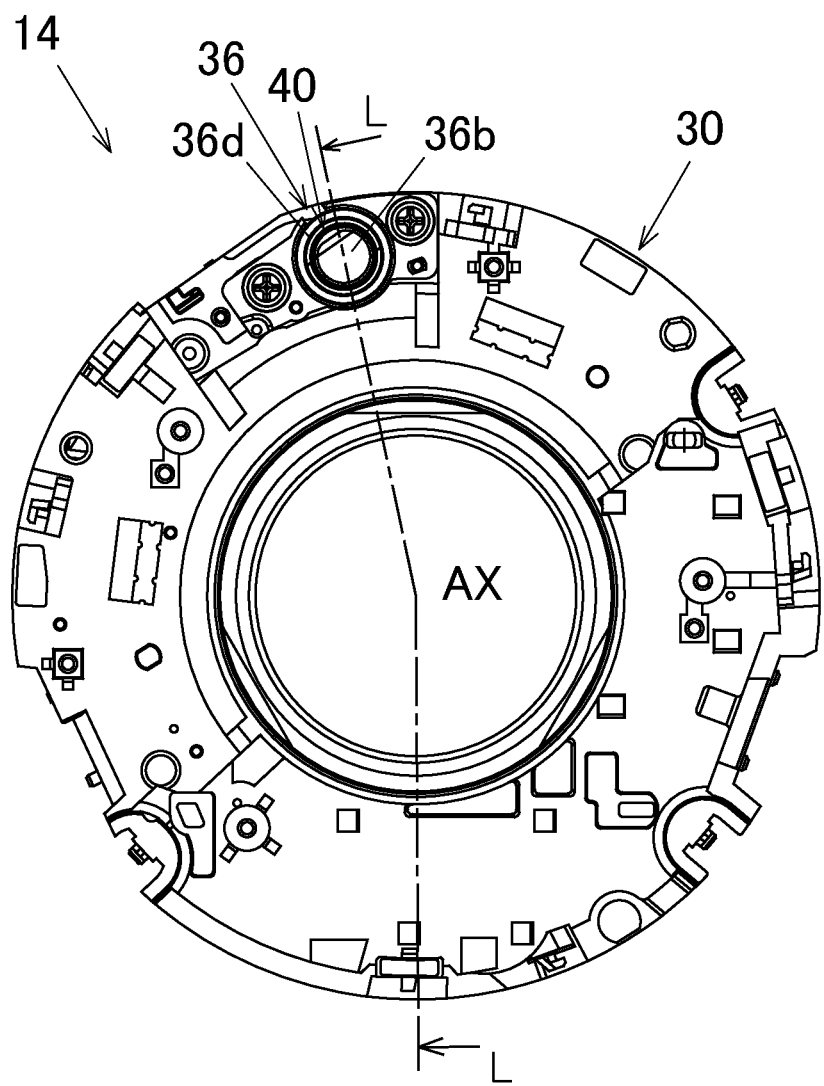
FIG. 7 is a view of the fixed frame included in the lens barrel in FIG. 2 as viewed from the image plane side.
Figure 8:
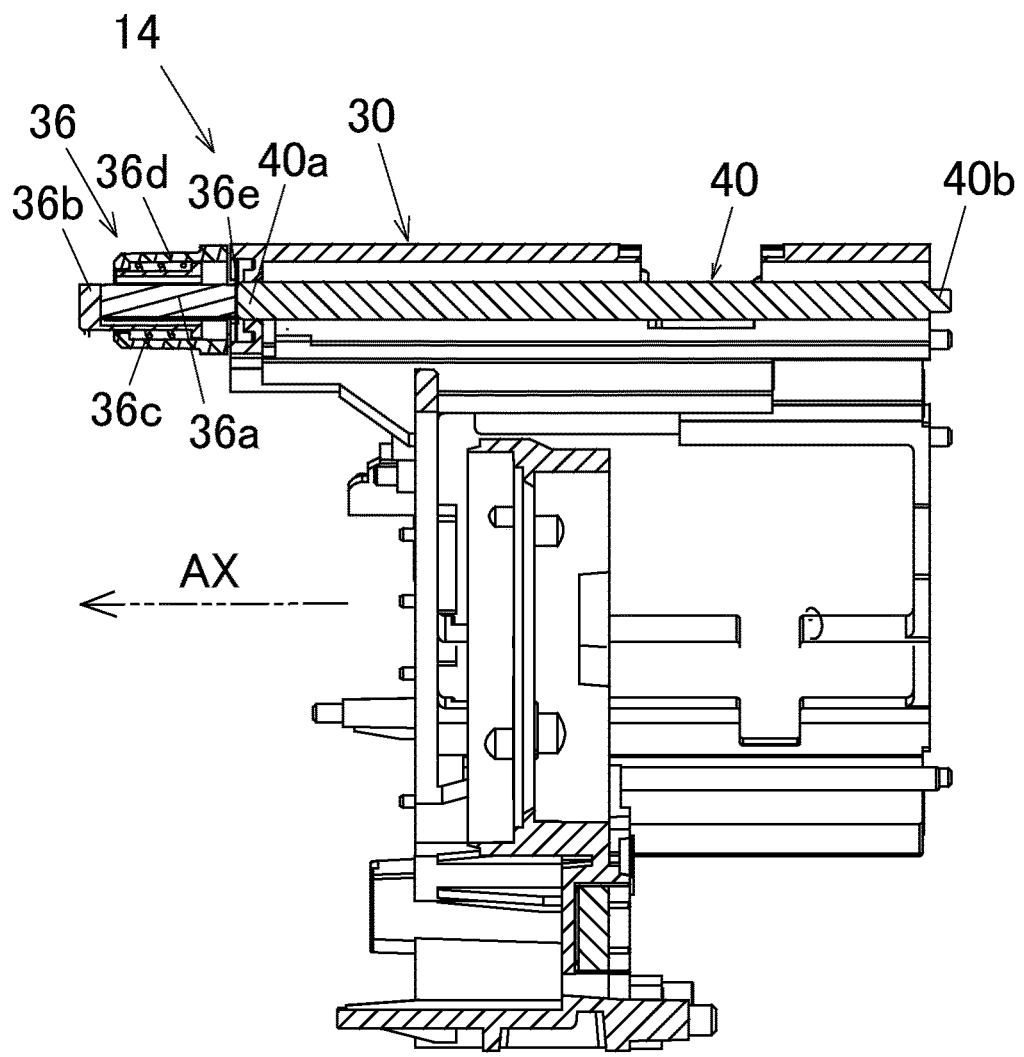
FIG. 8 is a cross-sectional view along the L-L line in FIG. 7.

FIGS. 3 to 8 show the configuration of the third and fourth lens group unit 14. FIG. 6 is a cross-sectional view along the J-J line in FIG. 5, and FIG. 8 is a cross-sectional view along the L-L line in FIG. 7.

The fixed frame 30 is a substantially cylindrical member that constitutes the outer shell of the third and fourth lens group unit 14, and in which are disposed the main yokes 31, the magnets 32, the movable frame 33, the main shaft guide (guide shaft) 40, the sub-shaft guide 41, and the like. A part of the fixed frame 30 is used as a first frame body constituting the optical device actuator (discussed below).

As shown in FIGS. 3 and 6, the main yokes 31 are substantially U-shaped members when viewed from the side surface, and as shown in FIG. 5, two main yokes 31 are provided on the outer peripheral surface side of the fixed frame 30.

As shown in FIG. 6, the magnets 32 are provided between the substantially U-shaped portions of the main yokes 31, and constitute an actuator that drives the movable frame 33 together with the drive coil 33c (discussed below). The magnets 32 generate a magnetic field M in the Z direction (inward in the radial direction) indicated by the arrow in FIG. 6. More precisely, the magnet 32 disposed on the upper side in FIG. 6 generates a downward magnetic field M in the figure, and the magnet 32 disposed on the lower side generates an upward magnetic field M in the figure.

As shown in FIGS. 4 and 6, the movable frame 33 can move back and forth in the optical axis AX direction relative to the fixed frame 30, and has a main shaft bearing portion 33a, a sub-shaft bearing portion 33b, a drive coil 33c, and a main body portion 33d.

The main shaft bearing portion 33a is a through-hole formed in the main body portion 33d along the optical axis AX direction, into which the main shaft guide 40 is inserted.

The sub-shaft bearing portion 33b is similar to the main shaft bearing portion 33a in that it is a through-hole formed in the main body portion 33d along the optical axis AX direction, into which the sub-shaft guide 41 is inserted.

The main shaft guide 40 is slidably engaged with the main shaft bearing portion 33a, and as shown in FIGS. 3 and 4, is disposed along the axis AX direction as a guide member in moving the movable frame 33 relative to the fixed frame 30. A first end 40a of the main shaft guide 40 in the optical axis AX direction is connected to a vibration imparting mechanism 36 (piezoelectric element 36a) (discussed below) (see FIGS. 8 and 9). Meanwhile, a second end 40b on the opposite side from the first end 40a is supported in a state of being fixed to a press-fitting hole 35a (see FIGS. 10 and 11) formed in the guide holding frame 35. Also, as shown in FIG. 4, a specific vibration is imparted to the main shaft guide 40 in the vibration imparting direction in the drawing from the vibration imparting mechanism 36 (discussed below) when the movable frame 33 is moved.

Figure 10:
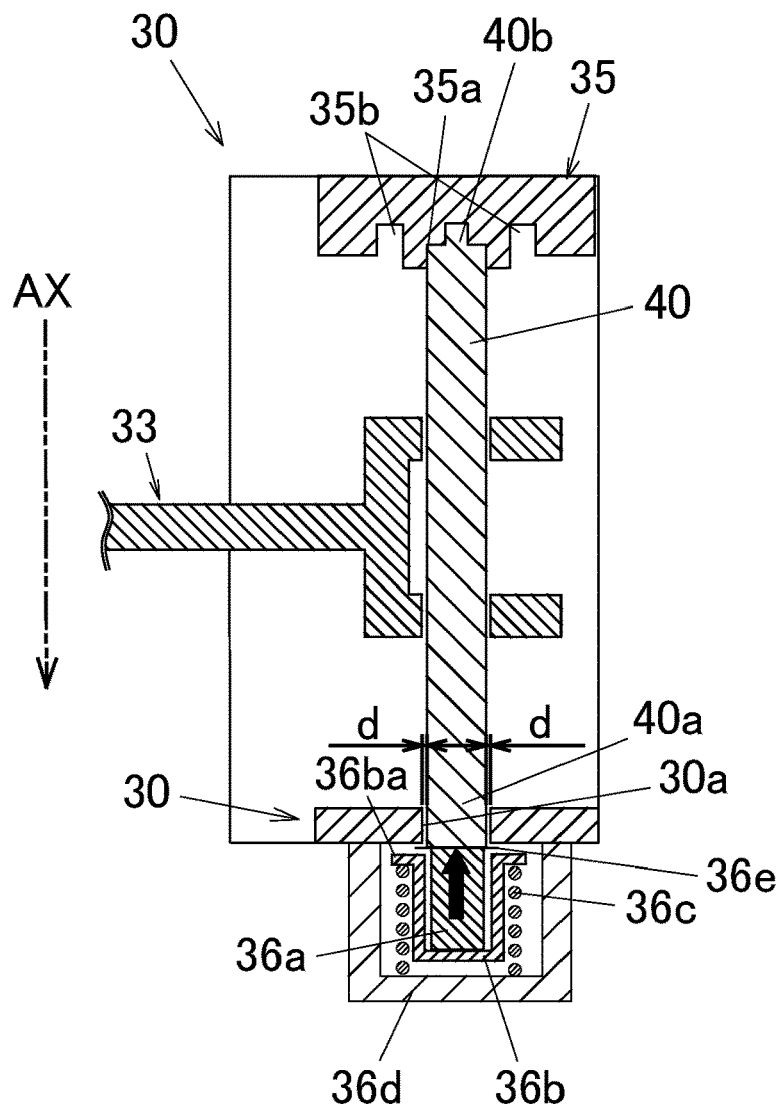
FIG. 10 is a schematic cross-sectional view of the configuration around the piezoelectric element and the configuration of the press-fitting part on the second end side of the main shaft guide.

Furthermore, as shown in FIG. 10, the first end 40a of the main shaft guide 40 is inserted into an insertion hole 30a formed in the fixed frame 30. An annular gap d is formed between the inner peripheral surface of the insertion hole 30a and the outer peripheral surface of the main shaft guide 40. The annular gap d is formed so as to surround the outer peripheral surface of the main shaft guide 40.

The sub-shaft guide 41 is inserted into the sub-shaft bearing portion 33b, and is disposed substantially parallel to the main shaft guide 40 as shown in FIGS. 3 and 4. The sub-shaft guide 41 is held at one end in the optical axis AX direction by the fixed frame 30, and at the end on the opposite side by the guide holding frame 35 (discussed below). The sub-shaft guide 41 functions as a guide member of the movable frame 33 so that when the movable frame 33 moves back and forth in the optical axis AX direction along the main shaft guide 40, the orientation of the movable frame 33 can be maintained together with the main shaft guide 40.

As shown in FIG. 6, the drive coil 33c is fixed on the main body portion 33d side of the movable frame 33, and is disposed near the main yokes 31 and the magnets 32 fixed on the fixed frame 30 side. When the movable frame 33 is moved, a current flows through the drive coil 33c in the X axis direction perpendicular to the drawing, as shown in FIG. 6.

Consequently, as shown in FIG. 6, a Lorentz force F1 in the Y axis direction (to the left) in the drawing can be generated in the movable frame 33 by the magnetic field generated by the magnets 32 inward in the radial direction, and by the current flowing through the drive coil 33c. Consequently, when current flows through the drive coil 33c, the movable frame 33 moves back and forth in the optical axis AX direction.

With the lens barrel 10 in this embodiment, the thrust exerted on the movable frame 33 depends on the Lorentz force F1 generated by the magnets 32 and the drive coil 33c. That is, in this embodiment, the thrust of the movable frame 33 does not depend on the vibration imparted by the vibration imparting mechanism 36 (discussed below).

As shown in FIG. 5, the main body portion 33d holds the focus lens L11 in its central portion. The main shaft guide 40 and the sub-shaft guide 41 are then inserted into the main shaft bearing portion 33a and the sub-shaft bearing portion 33b provided on the outer peripheral side of the portion of the main body portion 33d that holds the focus lens L11.

The counter yokes 34 are attached so as to cover the open portions of the substantially U-shaped main yokes 31.

As shown in FIG. 3, the guide holding frame 35 is disposed on the image plane side of the movable frame 33, which is on the opposite side from the subject side, in the optical axis AX direction. The guide holding frame 35 holds the respective ends of the main shaft guide 40 (second end 40b side) and the sub-shaft guide 41 at a position on the image plane side of the movable frame 33.

Figure 11:
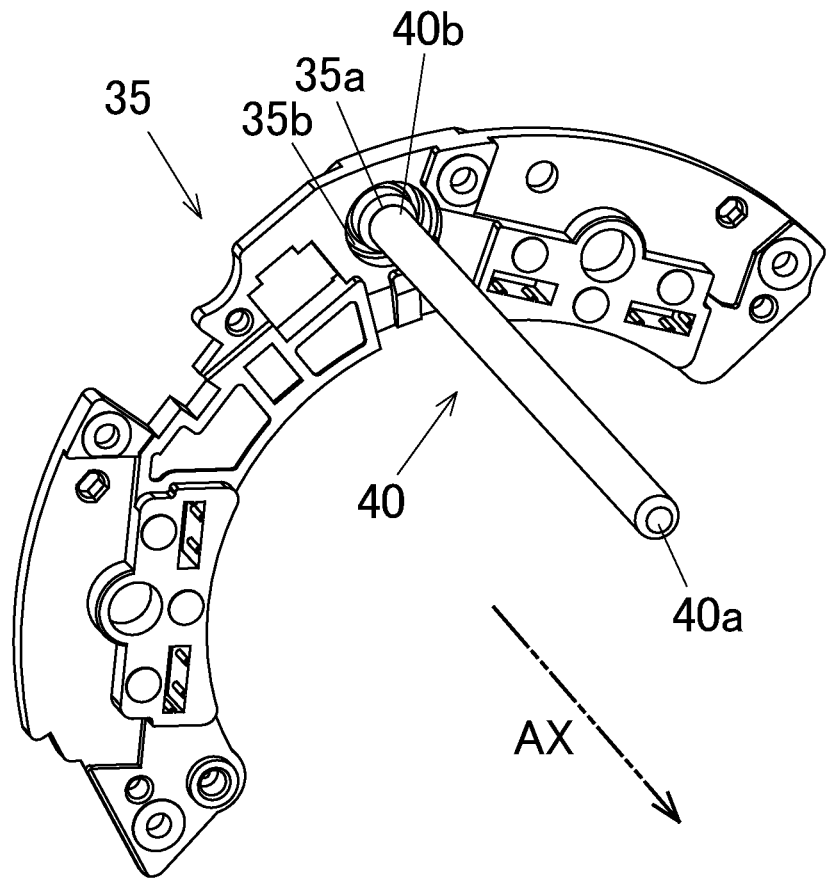
FIG. 11 is a detail view of the portion where the main shaft guide is press-fitted to the guide holding frame.

Also, the guide holding frame 35 has a press-fitting hole 35a into which the second end 40b of the main shaft guide 40 is press-fitted and fixed, and a groove portion 35b formed concentrically with the press-fitting hole 35a on the outer peripheral side of the press-fitting hole 35a (see FIGS. 10 and 11).

The focus control of the third and fourth lens group unit 14 will now be described.

Figure 16:
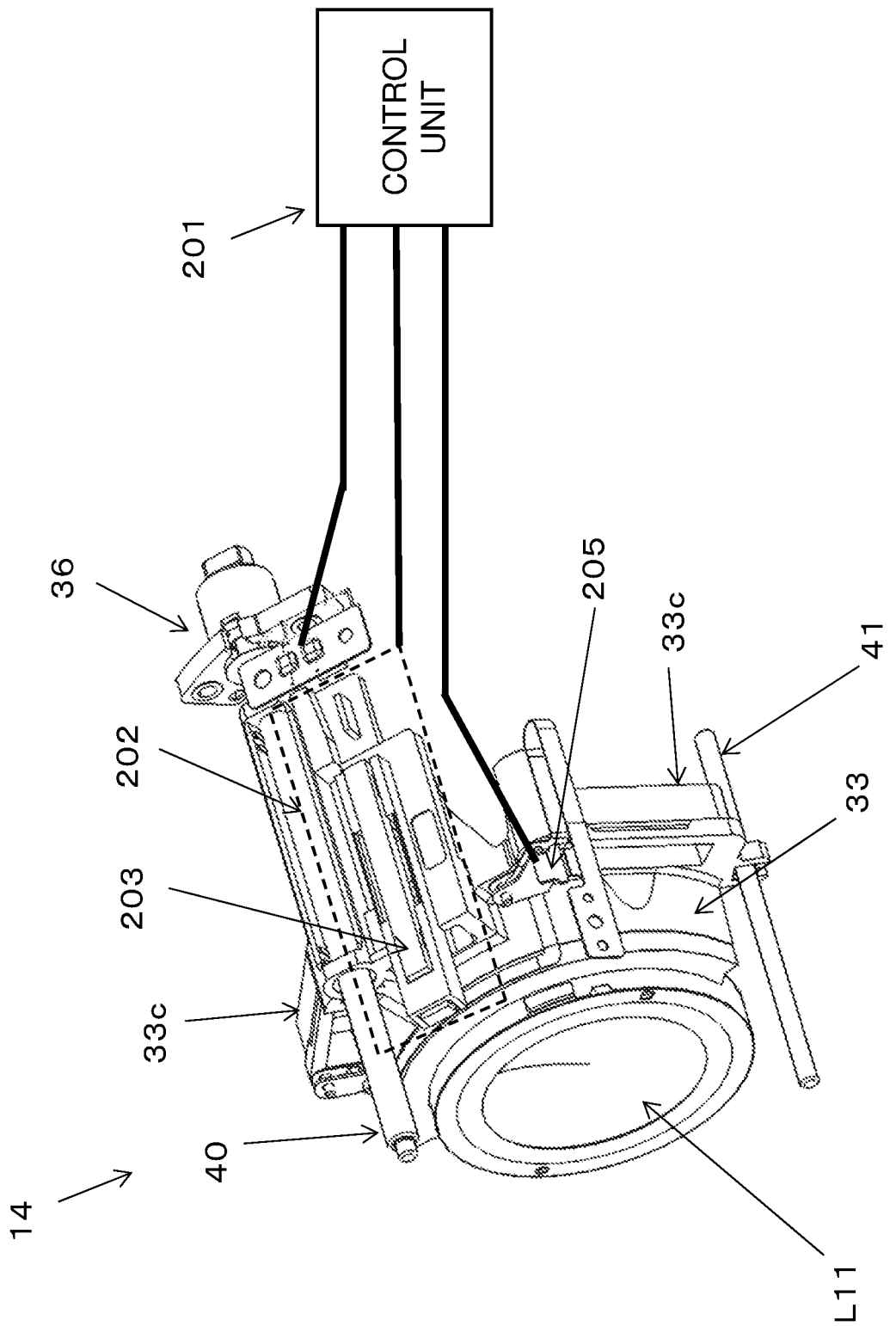
FIG. 16 is an oblique view illustrating the focus control of the third and fourth lens group units.

In FIG. 16, a position sensing unit 202 is made up of a sensor magnet 203 fixed to the movable frame 33, and an MR element (not shown) fixed to the fixed frame 30 so as to be opposite the sensor magnet 203. The position sensing unit 202 may be constituted by an encoder, and may be capable of sensing the position of the movable frame 33 with respect to the fixed frame 30.

The position sensing unit 202 is electrically connected to a control unit 201, and outputs the amount of movement of the sensor magnet 203 in the optical axis direction to the control unit 201. A coil terminal portion 205 of the drive coil 33c is electrically connected to the control unit 201.

The control unit 201 can move the movable frame 33 to the desired position by passing a drive current through the drive coil 33*c* on the basis of the current position of the movable frame 33 obtained from the position sensing unit 202.

Furthermore, the control unit 201 is electrically connected to the vibration imparting mechanism 36, and can control the operation of the vibration imparting mechanism 36.

In this embodiment, the control unit 201 has a configuration in which the amount of vibration and the vibration frequency of the vibration imparting mechanism 36 can be freely varied according to the current position and speed of the movable frame 33. For instance, the vibration speed of the main guide shaft is preferably higher than the moving speed of the movable frame 33.

Consequently, the relative speed between the main shaft guide 40 and the movable frame 33 above and below zero. Therefore, it is possible to cancel out the friction component whose direction reverses depending on the speed.

Also, in this embodiment, when the movable frame 33 moves, the control unit 201 controls the vibration imparting mechanism 36 so that the main shaft guide 40 vibrates at a speed of at least twice the moving speed of the movable frame 33, to the extent that the limit of mechanical strength is not exceeded.

This is because when the vibration is at less than double the speed, the relative speed between the movable frame 33, which is moved by the drive coil 33*c*, and the main shaft guide 40, which is vibrated by the vibration imparting mechanism 36, approaches zero when the vibration of the main shaft guide 40 reverses direction, and the friction component whose direction reverses depending on the speed cannot be completely cancelled out. Furthermore, the load, such as static friction, increases between the main shaft guide 40 and the movable frame 33, and the vibration imparting mechanism 36 will have an unintended effect on the movable frame 33.

(1-3) Configuration of Vibration Imparting Mechanism 36

As shown in FIGS. 3 and 4, the vibration imparting mechanism 36 is a mechanism that imparts vibration to the main shaft guide 40 in a direction substantially parallel to the axial direction of the main shaft guide 40, and as shown in FIGS. 7 and 8, is disposed at a position where the end (first end 40*a*) on the subject side of the main shaft guide 40 comes into contact. As shown in FIG. 3, the vibration imparting mechanism 36 has the piezoelectric element 36*a*, a weight 36*b*, a spring 36*c*, a holder (first frame body) 36*d*, and a cushioning sheet (cushioning material) 36*e*.

In this embodiment, the vibration imparting mechanism 36 is controlled to impart vibration in the range of 20 to 60 kHz, for example.

The piezoelectric element 36*a* is an element having piezoelectricity that generates a force when voltage is applied, and generates ultrasonic vibration by repeatedly expanding and contracting when an AC voltage is applied. The piezoelectric element 36*a* is used as an ultrasonic vibrator that imparts a specific ultrasonic vibration to the main shaft guide 40 in order to reduce the frictional resistance generated between the movable frame 33 (main body 33*d*) and the main shaft guide 40.

More specifically, the piezoelectric element 36*a* imparts a specific ultrasonic vibration to the main shaft guide 40 in the vibration imparting direction shown in FIG. 4 (substantially parallel to the axial direction) so that the static friction generated between the movable frame 33 (main body 33*d*) and the main shaft guide 40 changes to dynamic friction.

Here, if we let $\alpha$ be the acceleration at which the main shaft guide 40 vibrates due to ultrasonic vibration, and let mk be the mass of the movable frame 33, then the force required for the movable frame 33 to vibrate at the same acceleration $\alpha$ as the main shaft guide 40 is $\alpha \times mk$. Also, the force that can be transmitted from the main shaft guide 40 to the movable frame 33 is a frictional force T that acts between the main shaft guide 40 and the movable frame 33.

In a state where $T \geq \alpha \times mk$, the main shaft guide 40 and the movable frame 33 will move substantially integrally.

That is, the movable frame 33 vibrates at the acceleration $\alpha$ in accordance with the vibration at the acceleration $\alpha$ of the main shaft guide 40 by the piezoelectric element 36*a*. At this point, the force (frictional force T) that can be transmitted to the movable frame 33 is the same as or greater than the force ($\alpha \times mk$) required for the movable frame 33 to vibrate at the acceleration $\alpha$. Therefore, the vibration of the main shaft guide 40 is transmitted to the movable frame 33 at the same acceleration $\alpha$, and the main shaft guide 40 and the movable frame 33 move substantially integrally and do not slip relative to one another.

On the other hand, in the state where $T < \alpha \times mk$ (relational formula (1)), the main shaft guide 40 and the movable frame 33 do not move integrally, and relative slip occurs.

That is, even if the main shaft guide 40 is vibrated at the acceleration $\alpha$ by the piezoelectric element 36*a*, the movable frame 33 will not be able to vibrate at the acceleration $\alpha$, or will vibrate at an acceleration lower than the acceleration $\alpha$. When the vibration is at an acceleration lower than the acceleration $\alpha$, the amplitude of the movable frame 33 will be smaller than the amplitude of the main shaft guide 40. At this point, the force (frictional force T) that can be transmitted to the movable frame 33 is smaller than the force ($\alpha \times mk$) required for the movable frame 33 to vibrate at the acceleration $\alpha$. Therefore, the vibration of the main shaft guide 40 cannot be transmitted to the movable frame 33 at the same acceleration $\alpha$, and relative slip occurs between the main shaft guide 40 and the movable frame 33.

Also, in a state where $T < \alpha \times mk$, relative slip continues to occur between the main shaft guide 40 and the movable frame 33 for as long as the vibration by the piezoelectric element 36*a* continues. In this state, the friction between the main shaft guide 40 and the movable frame 33 is not static friction, but dynamic friction.

That is, as long as vibration by the piezoelectric element 36*a* continues in a state of $T < \alpha \times mk$, a dynamic friction state is always maintained between the main shaft guide 40 and the movable frame 33. In general, dynamic frictional force is smaller than static frictional force. Therefore, when a state in which dynamic friction is being generated is maintained, the movable frame 33 can be driven with a driving force that is smaller than that in a state in which static friction is being generated.

Also, when a dynamic friction state is being maintained, the so-called stick-slip phenomenon, which occurs when an object starts to move and transitions from a static friction state to a dynamic friction state, will not occur. Consequently, since a dynamic friction state is being maintained, the object can be moved with a small driving force without causing stick-slip, which is advantageous for high-precision drive with a very small amount of movement.

Further, in a state where $T < \alpha \times mk$, the movable frame 33 vibrates at an acceleration lower than the acceleration $\alpha$. That is, there are cases when the movable frame 33 vibrates at an amplitude smaller than that of the main shaft guide 40. This vibration amount is smaller than the amplitude of the main shaft guide 40 and smaller than the amplitude of the piezoelectric element 36*a*. The amplitude of the piezoelectric element 36*a* is sufficiently smaller than the accuracy required for position control of the driven body (the movable frame 33), being 1/10 or less, for example. Therefore, even if the driven body (the movable frame 33) is vibrated by the piezoelectric element 36a, there will be no problem with position control.

Consequently, the ultrasonic vibration imparted from the piezoelectric element 36a to the main shaft guide 40 can effectively reduce frictional resistance at the portion where the main body portion 33d of the movable frame 33 and the main shaft guide 40 come into contact. As a result, the movable frame 33 can be moved to the desired position quickly and with high accuracy by the Lorentz force F1 (see FIG. 6) generated by the actuators (the magnets 32 and the drive coil 33c).

Figure 12:
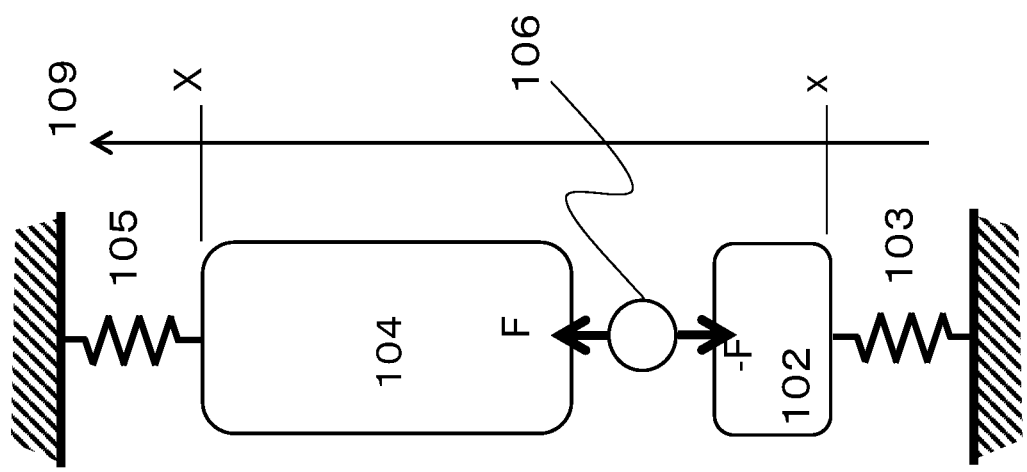
FIG. 12 is a diagram of the transmission model of FIG. 10.

FIG. 12 shows a vibration imparting portion 101 which is a simplification of the vibration imparting mechanism 36 of the present disclosure. 102 corresponds to the weight 36b, 103 to the spring 36c, 104 to the main shaft guide 40, 105 to the groove portion 35b, and 106 to the piezoelectric element 36a. Also, x and X indicate the positions of the weight 36b and the main shaft guide 40 in the axial direction 109, and F and −F are excitation forces generated by the piezoelectric element 36a. The cushioning sheet 36e is omitted in the simplified vibration imparting portion 101.

The following equation (100) shows a transfer function of the simplified vibration imparting portion 101, from the excitation force −F to the weight position x, and the following equation (101) shows a transfer function from the excitation force F to the main shaft guide position X.

[First Mathematical Formula]

$$x/F = \frac{1}{m1} \frac{S^2 + W1^2}{S^4 + (w3^2 + W4^2)S^2 + W3^2 \cdot W4^2} \quad \text{equation (100)}$$

[Second Mathematical Formula]

$$x/F = \frac{1}{m2} \frac{S^2 + W2^2}{S^4 + (W3^2 + W4^2)S^2 + w3^2 \cdot W4^2} \quad \text{equation (101)}$$

Equations (100) and (101) are expressed as typical frequency response characteristics, where $s=j\omega$ (j is an imaginary unit and $\omega$ is the angular frequency) and $\omega=2\pi f$ (f is the frequency (Hz)). In equation (100), m1 is the mass (kg) of the weight 36b, and in equation (101), m2 is the mass (kg) of the main shaft guide 40.

Figure 13:
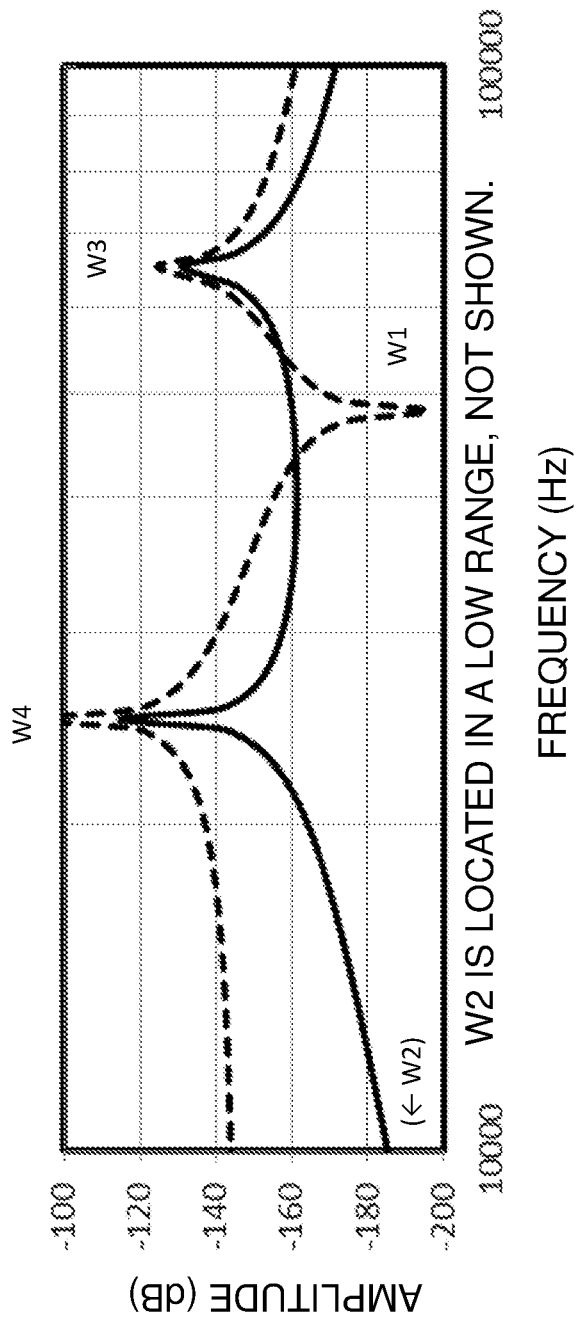
FIG. 13 is a graph of the frequency response characteristic of the simplified vibration imparting portion.

FIG. 13 is a graph of the frequency response characteristics of equations (100) and (101).

In FIG. 13, the dotted line shows the calculation result of equation (100), and the solid line shows the calculation result of equation (101). As shown in FIG. 13, the characteristics of equations (100) and (101) are expressed in a quadratic form having anti-resonance points at W1 and W2 (located in a range lower than 10,000 Hz and not shown), and having resonance points at W3 and W4. In this configuration, the values are set to satisfy the following relational expressions.

$W4<W1<W3$ $W2\times10<W4$ $20\times1000<W4/2\pi$ $50\times1000<W3/2\pi$ (In the above relational expressions, the units of W1, W2, W3, and W4 are radians per second.)

Figure 14:
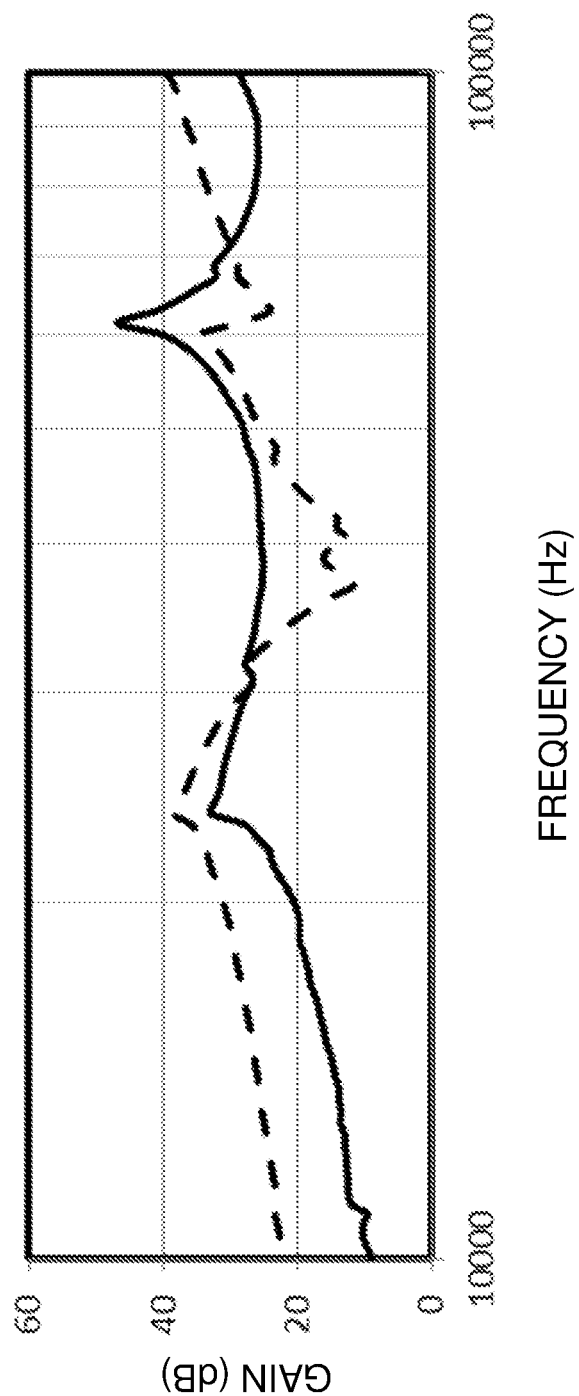
FIG. 14 is a graph of the frequency response characteristic of the actual vibration imparting portion.

FIG. 14 shows the characteristics of the actual vibration imparting portion, the solid line showing the frequency response characteristics of the main shaft guide 40, and the dotted line showing the characteristics of the weight 36b.

The solid line has peaks corresponding to the theoretically calculated values W3 and W4 shown in the equations (100) and (101) at 32 kHz and 65 kHz, and indicates a responsiveness that is flat and stable between these. Furthermore, the vibration responsiveness is kept low in the audible range and in the band of 10 kHz and lower to which the movable frame 33 is controlled.

Meanwhile, the dotted line has peaks similar to those of the solid line, but has an anti-resonance point corresponding to the theoretically calculated value W1 between the peaks, and the vibration responsiveness is suppressed.

Thus, with the vibration imparting mechanism 36 in this configuration, the main shaft guide 40 can be efficiently vibrated in the target frequency band of 32 to 65 kHz without generating noise or subjecting the movable frame 33 to the effect of control disturbance or the like. Also, vibration of the weight 36b can be suppressed in the target vibration imparting band, and the influence on external components of vibration generated on the weight 36b side can be reduced.

Figure 15A:
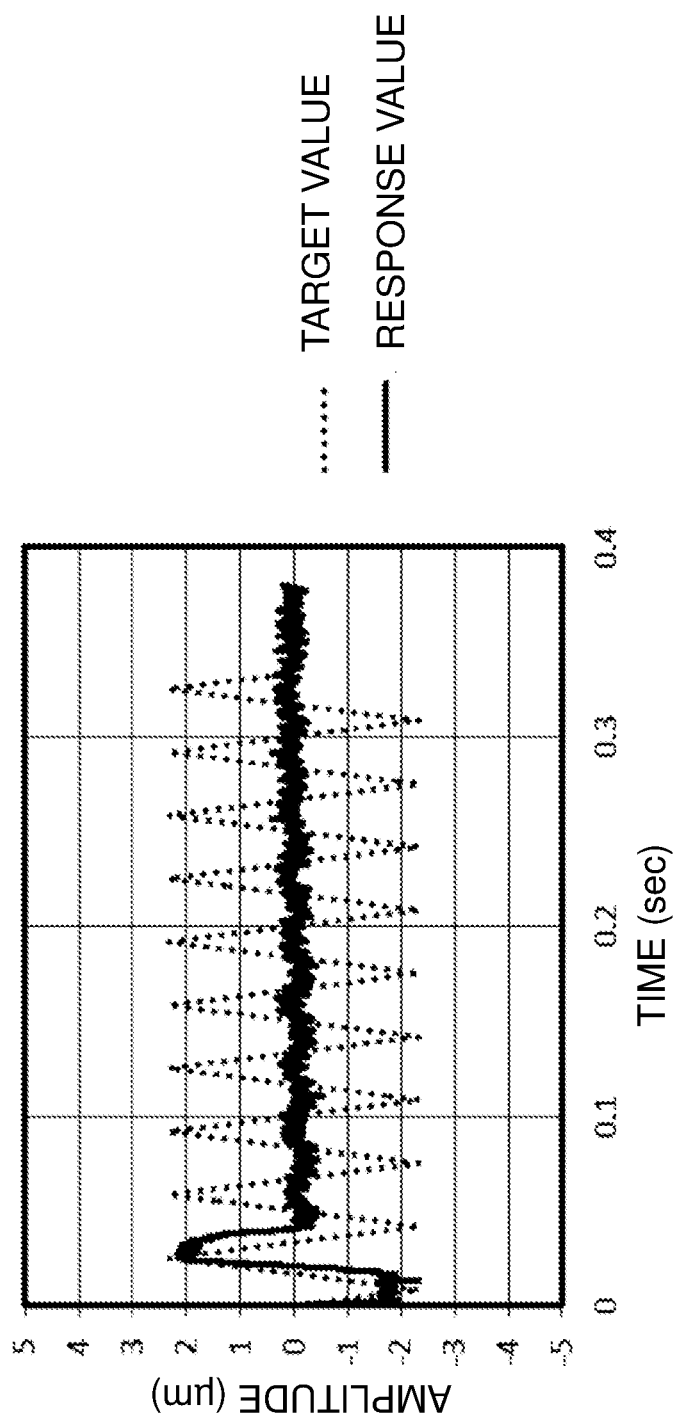
FIG. 15A is a graph of the relation between time and amplitude when no vibration is imparted.
Figure 15B:
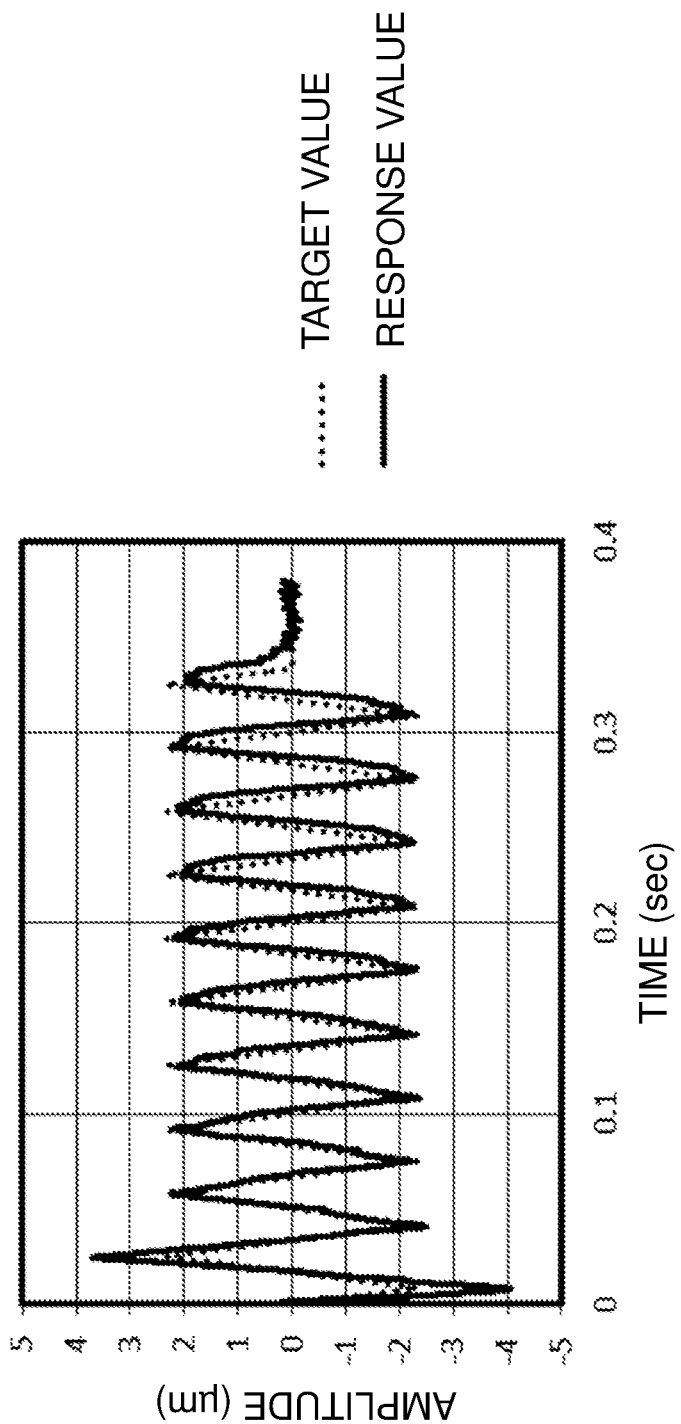
FIG. 15B is a graph of the relation between time and amplitude when vibration is imparted.

Next, the response waveforms of the movable frame 33 are shown in FIGS. 15A and 15B.

The dotted line in FIGS. 15A and 15B is the target value, which is a triangular wave of ±2.3 μm. The solid line in FIG. 15A is a measured waveform of the response value of the movable frame 33 to the target when no vibration is imparted. The solid line in FIG. 15B is the measured value of the response value of the movable frame 33 to the target value when vibration is imparted. Here, as shown in these graphs, the result of imparting vibration by the vibration imparting mechanism 36 in this configuration is that the movable frame 33, which did not follow the control target of about ±2 μm at all, can be made to follow a very small target value with extremely high accuracy.

Here, lead zirconate titanate (Pb(ZrTi)O$_3$), barium titanate (BaTiO$_3$), lead titanate (PbTiO$_3$), or another such piezoelectric ceramic is used for the piezoelectric element 36a, for example.

"Ultrasonic vibration" is an elastic vibration wave (sound wave) having a high frequency that cannot be heard by the human ear (such as a sound that cannot be heard as a stationary sound having a frequency of 20 kHz or higher), and in a broad sense refers to a sound that is used for some purpose other to be heard by a person, regardless of whether or not it can be heard by a human.

Figure 9:
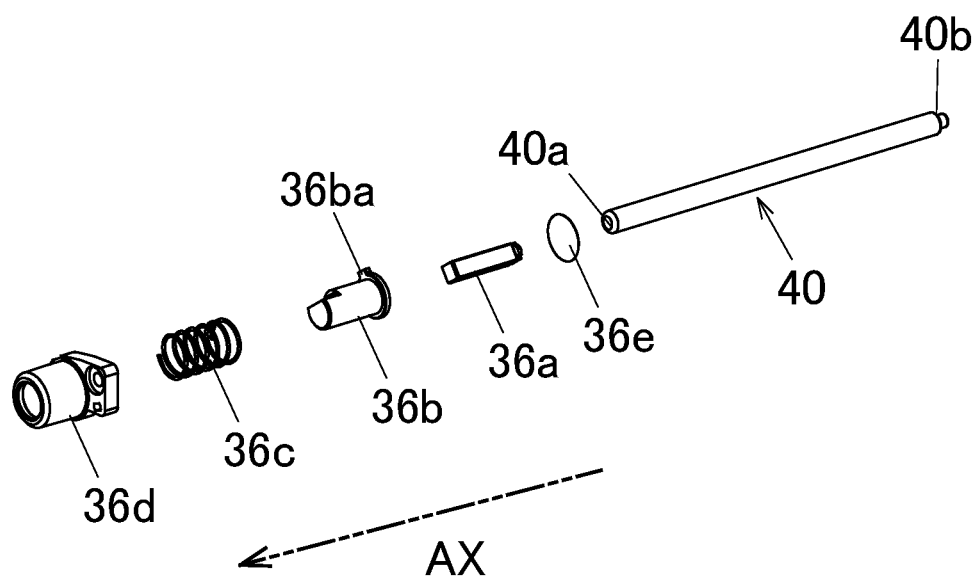
FIG. 9 is an exploded oblique view of the configuration around the connecting portion between the piezoelectric element and the main shaft guide.

The weight 36b is a bottomed, substantially cylindrical member, and is connected to the end of the piezoelectric element 36a on the subject side, as shown in FIG. 9. The weight 36b has a flange portion 36ba formed at the end of the substantially cylindrical outer peripheral surface on the image plane side, which is on the opposite side from the subject side. The flange portion 36ba is formed so as to project outward in the radial direction, and is pressed by a spring 36c (discussed below) along the axial direction of the main shaft guide 40. Also, the end of the piezoelectric element 36a on the opposite side from the connection side with the first end 40a of the main shaft guide 40 is fixed with an adhesive to the bottom surface of the weight 36b.

As shown in FIG. 9, the spring 36c is an elastic member formed as a solenoid spring, and is attached on the outer peripheral surface side of the weight 36b. As shown in FIG. 10, one end of the spring 36c is latched to the flange portion 36ba of the weight 36b, and the end of the opposite side is held inside the holder 36d and disposed in a compressed state inside the holder 36d.

Consequently, the spring 36c presses the piezoelectric element 36a toward the end surface of the first end 40a of the main shaft guide 40 via the weight 36b, in the axial direction (optical axis AX direction) of the main shaft guide 40. That is, the spring 36c is provided to bias the piezoelectric element 36a in the direction in which the main shaft guide 40 is vibrated, to transmit the behavior of the piezoelectric element 36a to the main shaft guide 40.

Also, the spring 36c supports the main shaft guide 40 in a state of being movable in a direction intersecting the axial direction when an external force is exerted on the main shaft guide 40 in a direction intersecting the axial direction. This makes it possible to prevent the connecting portion between the end surface on the first end 40a of the main shaft guide 40 side and the end surface of the piezoelectric element 36a on the opposite side of this from being broken.

Furthermore, the surface of the spring 36c is coated with anti-vibration grease. This improves the vibration isolation performance in the portion of the vibration imparting mechanism 36.

That is, in the configuration of this embodiment, the first end 40a side of the main shaft guide 40 is fixed to the inner surface side of the holder 36d (discussed below) via the weight 36b and the spring 36c.

As shown in FIGS. 9 and 10, the holder 36d is a bottomed, substantially cylindrical member, and the piezoelectric element 36a, the weight 36b, and the spring 36c are enclosed in the cylindrical internal space thereof. As described above, the holder 36d supports the end on the subject side of the enclosed spring 36c on the bottom surface. Furthermore, as shown in FIG. 10, the holder 36d is fixed to the fixed frame 30 so as to cover the portion of the fixed frame 30 where the insertion hole 30a is formed.

Consequently, the holder 36d constitutes the first frame body together with a part of the fixed frame 30.

The cushioning sheet 36e is a sheet-like member formed of a polyimide resin or the like, for example, and as shown in FIGS. 9 and 10, is held by the biasing force of the spring 36c between the end surface on the first end 40a side (subject side) of the main shaft guide 40 and the end surface on the image plane side of the piezoelectric element 36a. The end surface on the first end 40a side of the main shaft guide 40 and the end surface of the piezoelectric element 36a opposite the first end 40a are connected via the cushioning sheet 36e.

Main Features

In this embodiment, as discussed above, an optical device actuator that moves the movable frame 33 including the focus lens L11 back and forth in the optical axis AX direction comprises the movable frame 33 including the focus lens L11, the main shaft guide 40, the piezoelectric element 36a, the weight 36b, the fixed frame 30, the guide holding frame 35, and the spring 36c. The main shaft guide 40 supports the movable frame 33 movably in the optical axis AX direction of the focus lens L11. The piezoelectric element 36a imparts vibration to the first end 40a side of the main shaft guide 40. The weight 36b is fixed to the piezoelectric element 36a. The fixed frame 30 supports the piezoelectric element 36a and the weight 36b disposed on the first end 40a side of the main shaft guide 40. The guide holding frame 35 supports, in a fixed state, the second end 40b side, which is on the opposite side from the first end 40a side of the main shaft guide 40. The spring 36c is provided on the first end 40a side of the main shaft guide 40, and presses the piezoelectric element 36a against the first end 40a of the main shaft guide 40 in the axial direction via the weight 36b.

That is, with the configuration in this embodiment, the second end 40b side of the main shaft guide 40 is fixed in a state of being press-fitted into the guide holding frame 35, and in this configuration, the first end 40a side of the main shaft guide 40 is fixed to the holder 36d via the spring 36c.

Therefore, when an external force is exerted from a direction intersecting the axial direction of the main shaft guide 40, for example, the first end 40a side of the main shaft guide 40 moves in a direction intersecting the axial direction due to the elasticity of the spring 36c.

Consequently, damage to the connecting portion between the main shaft guide 40 and the piezoelectric element 36a can be effectively prevented.

Also, the second end 40b side of the main shaft guide 40 is supported in a fixed state on the guide holding frame 35.

Consequently, compared to a conventional floating structure, the second end 40b side of the main shaft guide 40 can be fixed and supported and the main shaft guide 40 can be supported more stably, which means that the optical axis AX of a plurality of lenses, including the focus lens L11, can be easily adjusted.

As a result, it is possible to easily adjust the optical axis of the lenses included in the lens barrel 10 while preventing damage caused by an external force exerted from a direction intersecting the axial direction of the main shaft guide 40.

Also, in this embodiment, as discussed above, the first end 40a side of the main shaft guide 40 is inserted into the insertion hole 30a formed in the fixed frame 30, through the annular gap d.

Consequently, even when an external force is exerted from a direction intersecting the axial direction of the main shaft guide 40, the first end 40a side of the main shaft guide 40 can move in a direction intersecting the axial direction within the range of the gap d. The first end 40a of the main shaft guide 40 is supported by the above-mentioned spring 36c. Therefore, in a configuration in which the second end 40b side of the main shaft guide 40 is press-fitted and fixed to the guide holding frame 35, even when an external force is exerted from a direction intersecting the axial direction, the first end 40a side of the main shaft guide 40 that has moved in a direction intersecting the axial direction can be moved within the range of the gap d, and damage to the connecting portion between the main shaft guide 40 and the piezoelectric element 36a can be prevented.

Furthermore, in this embodiment, in the connecting portion between the first end 40a of the main shaft guide 40 and the piezoelectric element 36a, the cushioning sheet 36e is disposed between the end surface of the first end 40a of the main shaft guide 40 and the end surface of the opposing piezoelectric element 36a.

Consequently, in a configuration in which the second end 40b side of the main shaft guide 40 is press-fitted and fixed to the guide holding frame 35, even when an external force is exerted from a direction intersecting the axial direction of the main shaft guide 40, any shear stress related to the connecting portion between the end surface on the first end 40a side of the main shaft guide 40 and the end surface of the piezoelectric element 36a will be absorbed by the cushioning sheet 36e, so breakage of the connecting portion can be prevented more effectively.

Since the cushioning sheet 36e provided as a cushioning material is formed in the shape of a thin sheet, the end surface on the first end 40a side of the main shaft guide 40 connected to the end surface of the piezoelectric element 36a can be stably supported.

Furthermore, in this embodiment, as shown in FIGS. 10 and 11, the guide holding frame 35 has an annular groove portion 35b formed around a press-fitting hole 35a into which the second end 40b of the main shaft guide 40 is press-fitted and fixed.

The annular groove portion 35b is disposed concentrically with the press-fitting hole 35a, and is formed so that the portion around the press-fitting hole 35a of the guide holding frame 35 to which the second end 40b side of the main shaft guide 40 is fixed will readily deform and move.

Therefore, when an external force is exerted on the main shaft guide 40 from a direction intersecting the axial direction, the area near the press-fitting hole 35a supporting the second end 40b will deform, which allows for the formation of a state in which the main shaft guide 40 can easily move in the direction of the optical axis AX, with the press-fitting hole 35a serving as a fulcrum. As described above, the first end 40a side of the main shaft guide 40 is supported via the spring 36c.

Consequently, even when an external force is exerted from a direction intersecting the axial direction of the main shaft guide 40, the external force can be released by moving the first end 40a side of the main shaft guide 40.

Also, since the peripheral portion of the press-fitting hole 35a in which the second end 40b side of the main shaft guide 40 is press-fitted and supported is formed into a thin-walled shape by the annular groove portion 35b, any vibration applied to the main shaft guide 40 can be absorbed.

As a result, damage when an external force is exerted can be prevented even more effectively, and vibration imparted to the main shaft guide 40 can be effectively absorbed.

Other Embodiments

An embodiment of the present disclosure was described above, but the present disclosure is not limited to or by the above embodiment, and various changes can be made without departing from the gist of the disclosure.

(A)

In the above embodiment, an example was given in which the cushioning sheet 36e was provided between the end surface on the first end 40a side of the main shaft guide 40 and the end surface of the piezoelectric element 36a on the opposite side was described. However, the present disclosure is not limited to this.

For example, the configuration may be such that the end surface on the first end 40a side of the main shaft guide 40 and the end surface of the piezoelectric element 36a on the opposite side are fixed with an adhesive.

However, as in the above embodiment, providing a cushioning material such as the cushioning sheet 36e between the end surface on the first end 40a side of the main shaft guide 40 and the end surface of the piezoelectric element 36a on the opposite side more effectively prevents damage to the connecting portion between the end surface on the first end 40a side of the main shaft guide 40 and the end surface of the piezoelectric element 36a on the opposite side.

(B)

In the above embodiment, an example was given in which the second end 40b side of the main shaft guide 40 was press-fitted and fixed in the press-fitting hole 35a of the guide holding frame 35. However, the present disclosure is not limited to this.

For example, the fixing of the second end side of the main shaft guide is not limited to press-fit fixing, and fixing with an adhesive or the like may be performed instead.

(C)

In the above embodiment, an example was given in which the optical device actuator of the present disclosure was applied to the third and fourth lens group unit 14, which was included in the lens barrel 10 comprising a plurality of lens groups. However, the present disclosure is not limited to this.

The object to which the optical device actuator of the present disclosure is applied is not limited to the fourth lens group unit of a lens barrel, for example, and may instead be an actuator that drives an imaging element or another movable frame.

(D)

In the above embodiment, an example was given in which vibration was imparted from the vibration imparting mechanism 36 to the main shaft guide 40 in a direction substantially parallel to the axial direction of the main shaft guide 40. However, the present disclosure is not limited to this.

The vibration imparted from the vibration imparting portion to the main shaft guide may be imparted in a direction intersecting the axial direction when reducing dynamic frictional resistance, for example.

(E)

In the above embodiment, an example was given in which ultrasonic vibration was imparted from the vibration imparting mechanism 36 to the main shaft guide 40. However, the present disclosure is not limited to this.

The vibration imparted from the vibration imparting portion is not limited to ultrasonic vibration, and as long as it is vibration that reduces the frictional resistance generated between a movable frame and a main shaft guide, vibration in the audible range may be imparted, for example.

Also, the ultrasonic vibration imparted from the vibration imparting portion is not limited to the range of 20 to 60 kHz described in the above embodiment, and ultrasonic vibration outside this range may be applied instead.

(F)

In the above embodiment, an example was given in which a solenoid spring was used as the elastic member. However, the present disclosure is not limited to this.

For example, instead of a solenoid spring, a leaf spring or another such elastic member may be used. That is, the elastic member is not particularly limited as long as it presses the guide shaft in the axial direction.

(G)

In the above embodiment, an example was given in which a part of the fixed frame 30 serving as the first frame body and the guide holding frame 35 serving as the second frame body were provided as separate members. However, the present disclosure is not limited to this.

For instance, the first frame body and the second frame body may be integrated.

(H)

In the above embodiment, an example was given in which the spring 36c was coated with anti-vibration grease. However, the present invention is not limited to this.

For instance, it is not essential to coat the spring or other such elastic member with anti-vibration grease, and the configuration may be such that no grease is applied.

INDUSTRIAL APPLICABILITY

The optical device actuator disclosed herein has the effect of preventing damage caused by an external force exerted from a direction intersecting the axial direction of the guide shaft, while allowing for easy adjustment of the optical axis of the lenses, and therefore can be widely applied in actuators that are mounted on a variety of optical devices.

REFERENCE SIGNS LIST 10 lens barrel
11 first lens group unit
12 second lens group unit
13 cam frame
14 third and fourth lens group unit
16 fifth lens group unit
17 exterior unit
18 base ring
30 fixed frame (first frame body)
30*a* insertion hole
31 main yoke
32 magnet (drive unit)
33 movable frame
33*a* main shaft bearing portion
33*b* sub-shaft bearing portion
33*c* drive coil (drive unit)
33*d* main body portion
34 counter yoke
35 guide holding frame (second frame body)
35*a* press-fitting hole
35*b* groove portion
36 vibration imparting mechanism
36*a* piezoelectric element (vibration imparting portion)
36*b* weight
36*ba* flange portion
36*c* spring (elastic member)
36*d* holder (first frame body)
36*e* cushioning sheet (cushioning material)
40 main shaft guide (guide shaft)
40*a* first end
40*b* second end
41 sub-shaft guide
AX optical axis
d gap
F1 Lorentz force
L11 focus lens
M magnetic force

The invention claimed is:

1. An optical device actuator, comprising:
a movable frame that includes a lens;
a guide shaft that movably supports the movable frame along an optical axis of the lens;
a vibration imparting portion configured to impart vibration to a first end side of the guide shaft;
a weight that is fixed to the vibration imparting portion;
a first frame body that supports the weight and the vibration imparting portion disposed on the first end side of the guide shaft such that the supported weight and vibration imparting portion remains movable relative to the first frame body in a direction intersecting the axial direction;
a second frame body that supports, in a fixed state, a second end side of the guide shaft that is on an opposite side from the first end side; and
an elastic member that is provided on the first end side of the guide shaft and configured to press the vibration imparting portion along an axial direction against a first end of the guide shaft via the weight.

2. The optical device actuator according to claim 1, further comprising a cushioning material that is disposed between the first end of the guide shaft and the vibration imparting portion.

3. The optical device actuator according to claim 2, wherein the cushioning material is formed in a shape of a sheet.

4. The optical device actuator according to claim 1, wherein the second frame has a press-fitting hole in which a second end of the guide shaft is fixed and supported by press-fitting.

5. The optical device actuator according to claim 4, wherein the second frame further has a groove formed concentrically with the press-fitting hole on an outer peripheral side of the press-fitting hole.

6. The optical device actuator according to claim 1, wherein the elastic member is disposed between the weight and the first frame body.

7. The optical device actuator according to claim 6, wherein the elastic member is a solenoid spring.

8. The optical device actuator according to claim 1, wherein the elastic member is coated with anti-vibration grease.

9. The optical device actuator according to claim 1, wherein a first end of the vibration imparting portion on the opposite side from the side connected to the guide shaft is adhesively fixed to the weight.

10. The optical device actuator according to claim 1, wherein the vibration imparting portion imparts vibration to the first end of the guide shaft along the axial direction of the guide shaft.

11. The optical device actuator according to claim 1, wherein the vibration imparting portion is a piezoelectric element.

12. The optical device actuator according to claim 1, wherein the lens is a focus lens.

13. A lens barrel, comprising:
the optical device actuator according to claim 1; and
a plurality of lens groups disposed so as to align the lens with an optical axis direction.

14. The optical device actuator according to claim 1, wherein
an elastic member that is provided on the first end side of the guide shaft and is attached to a side of an outer peripheral surface of the weight.

* * * * *